United States Patent Office 3,479,415
Patented Nov. 18, 1969

3,479,415
ISOMERIZATION OF OLEFINIC
HYDROCARBONS
Samuel E. Shull, Media, Pa., assignor to Air Products
and Chemicals, Inc., Philadelphia, Pa., a corporation
of Delaware
No Drawing. Filed May 12, 1967, Ser. No. 637,917
Int. Cl. C07c 11/08, 5/30
U.S. Cl. 260—680
8 Claims

ABSTRACT OF THE DISCLOSURE

Olefinic hydrocarbons having 4 or more carbon atoms are selectively isomerized to effect shifting of the double bond by contact at elevated temperature with a macroporous silica catalyst which is essentially free of alkali metal ions. Thus, from a charge stock consisting essentially of cis- and transbutene-2 (98+%), over 25% conversion of the charge to butene-1 is obtained at a selectivity of 98% or more. Preferred operating conditions include temperatures in the range of about 800–850° F. at liquid hourly space velocity of about 5.

BACKGROUND OF THE INVENTION

The present invention relates to isomerization of olefinic hydrocarbons having more than 3 carbon atoms particularly olefins of 4 to 6 carbon atoms to effect shifting of the double bond.

The shifting of the double bond in olefinic hydrocarbons, whether for conversion of mixed olefins to products of higher alpha olefin content or for inward shifting of a terminal double bond has been extensively reported in patent and periodical literature. A wide and divergent range of unrelated catalysts has been suggested to promote this reaction but none of these has been particularly attractive for commercial use because of undesired side reactions including carbon-carbon scission, skeletal isomerization and/or excessive coke-formation under reaction conditions promoting the desired isomerization reaction.

SUMMARY OF INVENTION

In accordance with the present invention shifting of the double bond in a olefin of 4 or more carbon atoms is carried out over catalyst consisting essentially of macroporous silica essentially free of alkali metal ions. A wide range of operating conditions are available including temperatures of 600 to 1100° F. and liquid volume space rates of 0.5 to 50. Preferred operating conditions are at about 800–850° F. and space rates (LHSV) of about 5.

The invention finds particular utility in the conversion of cis and trans butene-2 to butene-1. The process can thus be profitably used in conjunction with an oxidative dehydrogenation process for conversion of butenes to butadiene, since enrichment of the butene-1 content of the feed to such process improves the yield and selectivity of conversion to butadiene product.

CATALYST PREPARATION

The catalyst employed in practice of the invention is a macroporous silica essentially free of alkali metal ions. Typical catalysts are those analyzing 99% or higher $SiO_2$ (dry), having a surface area of 250 to 400 m.²/g. and a pellet porosity of 60 to 75 vol. percent. Macroporous silica catalyst conforming to the above criteria can be prepared in bead form by a modification of the method generally described in Lebeis, U.S. Patent 2,665,258, avoiding the use of the alumina. An example of such preparation is given below:

Example 1

High purity silica gel powder having an average particle size within the range of from 5 to 15 microns was suspended in an aqueous sodium silicate solution containing four times as much silica. The suspension was mixed with aqueous sulfuric acid to prepare a hydrosol, which was discharged onto the surface of a kerosene bath to form globules. As they fell through the kerosene the globules set to firm hydrogel beads. The beads were treated with aqueous ammonium nitrate as a base exchange step and then water washed, thereby removing all sodium salts from the silica. After hot aging, the purified silica beads were dried at a temperature above 250° F. but not greater than 350° F. in the presence of a high humidity atmosphere and then in air to a residual water conent of less than 5 weight percent to provide powder-included silica gel beads in which more than 10% of the pore volume was provided by pores having a pore radius greater than 200 angstroms, that is, a pore diameter greater than 0.04 micron. The dried beads are calcined in air at 1050° F.

Suitable catalyst can also be prepared from commercially available granular macroporous silica of high porosity by reducing the alkali metal content of such catalyst to below 0.03% $Na_2O$. Such macroporous catalysts are prepared according to one method by agitating a settable silica sol during its transition from sol to gel state. Removal of alkali metal from such commercial macroporous silica can be effected by base exchange preferably preceded or followed by leaching with acetic acid. One such method is described in the following example.

Example 2

The commercial macroporous silica gel conformed to the following specifications (Davison "Grade 59" silica gel).

| | |
|---|---:|
| Silica content _____percent min__ | 99.0 |
| Total volatile @ 1750° F. _____percent max__ | 4.5 |
| Apparent density _____lbs./ft.³__ | 27 |
| Surface area _____m.²/g__ | 325 |
| Pore diameter (avg.) _____ angstroms__ | 140 |
| Pore volume _____cc./g__ | 1.16 |

Chemical analysis (typical dry basis): Wt. percent

| | |
|---|---:|
| Silica as $SiO_2$ _____ | 99.50 |
| Iron as $Fe_2O_3$ _____ | 0.01 |
| Aluminum as $Al_2O_3$ _____ | 0.10 |
| Titanium as $TiO_2$ _____ | 0.02 |
| Calcium as CaO _____ | 0.07 |
| Sodium as $Na_2O$ _____ | 0.06 |
| Zirconium as ZrO _____ | 0.03 |
| Trace elements _____ | 0.03 |

The material as received was found to be practically inactive for isomerization of butenes, tested at 850° F. and 950° F.

(a) The "as received" silica granules (nominal 8 mesh size) were leached twice, at one hour each treatment, with 10% acetic acid using a volume of acid solution per volume of granules. The leached granules were then washed in distilled water (5 times) and dried for two hours at 250° F. followed by calcination at 1050° F. for two hours in "bone dry air."

(b) After cooling to room temperature, the granules from (a) above were ion-exchanged with excess 10% ammonium nitrate solution, four times at one hour each. The ion-exchanged product was then washed with distilled water (4 times). The exchanging followed by water washing was then repeated for 3 cycles at 180° F. with occasional stirring of the granules in the liquid during the exchanging and washing steps. Following the last water wash the granules were dried at 250° F. and again calcined at 1050° F. in "bone dry air."

The foregoing treatment resulted in removal of at least part of the calcium content of the original silica granules and in reducing the sodium to less than 0.03% $Na_2O$ by weight.

EQUILIBRIUM DATA.—ISOMERIZATION OF BUTENES

Calculations for the equilibrium distribution of n-butylene isomers based on the free energy data, published in API Project 44 (1959) and that in Journal of Research, U.S. NBS vol. 36 (1946) pages 559 to 612, differ widely. For this reason, independent determination of the equilibrium composition at various temperatures were made at the Houdry Laboratories using chrome-alumina catalyst known to be an effective isomerization catalyst (Canadian Journal of Chemistry 40, 2130 1962). The values thus obtained compared favorably with data independently reported by others (Kallo, D. and Schay, G., Kinetics of the Isomerization of n-Butene Catalyzed by Alumina and Silica-Alumina, Acta. Chim. Hung. Temus 39, 1963).

Comparison of equilibrium composition data at 1000° F. is given below:

|  | Houdry | API Proj. 44 | Kallo/ Schay | USNBS |
| --- | --- | --- | --- | --- |
| Mol percent: |  |  |  |  |
| Butene-1 | 31.4 | 24.5 | 31.4 | 33.4 |
| Cis butene-2 | 29.5 | 30.3 | 309.9 | 26.5 |
| Trans butene-2 | 39.1 | 45.2 | 37.7 | 40.1 |

The Houdry equilibrium data at several other temperatures used in the experiments are given below:

|  | 613° F. | 794° F. | 967° F. | 1,100° F. |
| --- | --- | --- | --- | --- |
| Mol percent: |  |  |  |  |
| Butene-1 | 20.6 | 26.0 | 30.6 | 33.7 |
| Cis butene-2 | 32.4 | 31.5 | 29.4 | 28.7 |
| Trans butene-2 | 47.0 | 42.5 | 40.0 | 37.6 |

These values show excellent agreement compared with calculated values based on the equilibrium constants determined as a function of reciprocal absolute temperature. (Van't Hoff reaction isobar with constant heat of reaction).

In utilizing the macroporous low alkali-metal ion catalyst of the invention, conversion of cis and trans butene-2 to butene-1 is obtained at yields in the order of 90% of equilibrium and at selectivities of 98% and above. Moreover, the coking rate was low enough to permit continuous operation for three days or longer without regeneration of the catalyst.

ISOMERIZATION RUNS

A series of exploratory runs (over chrome-alumina catalyst) were made on a mixture of about 60% trans and 40% cis butene-2 to determine the effect of process variables on isomerization yields and selectivity. It was found that use of hydrogen diluent with the hydrocarbon feed did reduce coke make but simultaneously effected hydrogenation of a small portion of the butenes to butane. Steam as diluent impaired isomerization activity; because of higher operating temperatures required to achieve conversion in the presence of steam diluent, expected reduction in rate of coke laydown is offset. Increase of pressure substantially above atmospheric also increased coke production without any observable compensating benefit. As a result of these preliminary studies, it was determined that neither dilution of the charge nor elevation of pressure were sufficiently attractive to warrant further extensive study.

In test runs on the commercial silica catalyst of Example 2, prior to sodium removal, in the conversion of technical grade butene-2 feed, less than 2% isomerization was obtained at 5 LHSV and at temperatures up to 1000° F.

EXAMPLE 3

The charge stock comprised a $C_4$ olefin fraction containing 55.8% trans- and 42.6% cis-butene-2 by weight (also about 0.5% of butene-1, about 0.9% butane and 0.2% butadiene). This charge was passed over catalyst produced in Example 2 above, at the conditions and with results tabulated below:

|  | Cumulative hrs. on stream | | | |
| --- | --- | --- | --- | --- |
|  | 1 | 2 | 1 | 20 |
| Avg. bed temp.° F | 841 | 838 | 817 | 817 |
| Pressure | Atmospheric | | | |
| LHSV | 4.49 |  |  | 5.03 |
| Prod. Distrib. wt. percent |  |  |  |  |
| charge butane | .85 | .93 | .85 | .81 |
| Butene-1 | 26.38 | 27.2 | 24.97 | 23.53 |
| i-Butene | .35 | .49 | .22 | .20 |
| Trans butene-2 | 42.11 | 40.52 | 48.48 | 44.45 |
| Cis-butene-2 | 30.03 | 30.59 | 30.31 | 30.77 |
| Butadiene | .27 | .21 | .16 | .23 |
| Unidentif | 0.1 | .06 | 0.1 | 0.1 |
| Coke |  |  | .0007 |  |
| Butene-1 (selectivity) | 99.1 | 89.4 | 99.5 | 99.8 |

Example 4

(a) Commercial macroporous silica granules of the type described in Example 2 above were treated to remove sodium in the following manner. The granules were exchanged three times for one hour each with 20% ammonium nitrate solution at 180° F. and batch washed three times with distilled water with vigorous agitation during the liquid treatments. The washed catalyst was dried at 250° F. and then leached with 10% acetic acid twice at room temperature followed by washing (five times) in distilled water. The washed catalyst was again dried and calcined for 2 hours in "bone dry air" at 1050° F.

(b) The catalyst thus prepared was used in conversion of a butene-2 stream having the composition described in the previous Example (3). During the twenty-second hour on-stream at approximately 5 LHSV, with the average bed temperature at 837° F., over 26% butene-1 was produced by weight of charge at over 99% selectivity. Coke make during the runs was less than 0.01% by weight of hydrocarbons charged.

Example 5

The catalyst employed was that described in Example 1 above. The charge was a technical butene-2 feed of the following composition:

| | Wt. percent |
| --- | --- |
| Butane | 1.07 |
| Butene-1 and isobutene-1 | 0.34 |
| Trans butene-2 | 57.29 |
| Cis butene-2 | 41.04 |
| Butadiene | 0.25 |
| Unidentified | 0.01 |

The run was made at atmospheric pressure and 4.85 LHSV for a period of approximately 84 hours during which the average bed temperature varied between 804 and 855° F. Butene-1 (including a small amount of isobutene) obtained on periodic sampling of products averaged 25.61% by weight of charge throughout 75 hrs. of the period in which data was recorded. The yield of butene-1 during the 75th hour was 25.64% at an average bed temperature of 851° F. Coke make averaged 0.0004% by weight of charge. Typical product distribution (taken during the sixth hour of the run at average bed temperature of 816° F.) is reported below:

| | Wt. percent charge |
| --- | --- |
| n-Butane | 1.10 |
| Butene-1 and i-butene | 25.81 |
| Trans butene-2 | 42.91 |
| Cis butene-2 | 29.92 |
| Butadiene | 0.22 |
| Unidentified | 0.04 |

A run made over the same catalyst at a liquid hourly space velocity of 10.29 and at a pressure of 10 p.s.i.g. and at an average reactor temperature of 964° F. produced 22.76% butene-1 from the described technical grade butene-2 at a selectivity of 99.2% during the first hour of the run, and 22.72% butene-1 at 98.8% selectivity during the second hour (during which the average reactor temperature was 975° F.).

In another series of runs over macroporous silica (Ex. 1) catalyst the effect of varying processing conditions on butene-1 yields, was studied. At 810° F. and 5 LHSV, butene-1 yield averages about 23% by weight of feed. By doubling the space velocity at the same temperature, the yield of butene-1 is lowered to about 18.5% by weight of feed; at the double space rate (LHSV=10) it would require a temperature in the order of 1000° F. to achieve the 23% butene-1 yield obtained at the lower space rate. While space rates lower than 5 (as low as 1 or less) can be used with correspondingly lower temperatures to achieve near equilibrium yields of butene-1, these offer no special advantage from economic considerations because of reduced throughput of charge for a given reactor size. While increased severity of operation (higher temperature or lower space rate) results in higher conversion to butene-1, there is a corresponding loss in selectivity because of accompanying side reactions other than the desired butene-2 to butene-1 conversion. While choice of operating conditions will therefore be governed by the foregoing considerations of yield versus selectivity desired, the indicated preferred operation at about 800–850° F. and space rate of 5 obtains with the described macroporous silica catalyst yields of about 25% per pass butene-1 (90% of equilibrium) with selectivities of 98% and higher. The non-selective product comprises predominantly isobutene. Whether operating at about 815° F. or at about 975° F., butene-1 yields in the order of 24% by weight of feed are obtained at about 99% selectivity; at the higher temperatures, however, the average coking rate is increased at a significant rate—almost ten-fold in going from operation temperatures of about 800 to about 900° F. Ignoring the effect of increased rate of coking, however, it was found that butene-1 selectivities of 98% are obtained also at the higher end of the temperature range, approaching 1000° F., at yields representing about 90% of equilibrium values.

As coke accumulates on the catalyst some temporary reduction of catalyst activity results. Thus, in a 75 hour run at a nominal operating temperature of 830° F., the butene-1 yield dropped from 26.3% to 24.5% by weight of charge. The catalyst is easily regenerated to approximately its initial activity by conventional combustion of the coke deposited thereon, in oxygen-containing gas such as air or diluted air of lower oxygen concentration.

As indicated above, conversion of butene-2 to butene-1 is of particular value in connection with preparation of feed to an oxidative dehydrogenation process for production of butadiene. In operation of such process, the fresh $C_4$ feed composed chiefly of $C_4$ olefins is split to separate an overhead fraction rich in butene-1 from a bottoms fraction rich in butene-2. The butene-2 fraction is isomerized over the described macroporous, low sodium silica catalyst and the near equilibrium isomerizate, enriched in butene-1, is added to the fresh $C_4$ feed stream sent to the splitter. The overhead from the splitter, rich in butene-1, is sent to oxidative dehydrogenation. The products from the dehydrogenation are fractionated to recover butadiene and to recover unconverted butylenes, chiefly butene-2, which are recycled to join the butene-2 feed charged to isomerization.

While in the foregoing specific examples the isomerization process was illustrated in the conversion of butene-2 to butene-1, it will be understood that the reaction is reversible and that equilibrium composition can be approached from either direction, (See McCarthy, W. Walter and Turkevich, John—Journal of Chemical Physics (October 1944) vol. 12, pages 405–408) so that the described macroporous silica catalyst is also beneficial in promoting conversion of butene-1 to butene-2 as well as for enriching the butene-1 content of an olefinic fraction containing less than equilibrium amount of butene-1 component.

Mono-olefins of higher carbon atom content than butylene, particularly pentenes and hexenes, can also be isomerized to shift the position of the double bond, over the silica catalysts hereinbefore described. Among these higher molecular weight olefins, those having one or more branched chains and particularly the tertiary olefins are readily isomerized at comparatively low temperatures. The normal olefins are less readily isomerized and shifting of the double bond leads to the formation of mixtures containing not only isomers differing in double bond position but those isomerizates also containing accompanying branched isomers and other concomitant reaction products of higher and/or lower molecular weight and of different hydrogen/carbon ratios. While the production of the high yields of a single olefin or desired isomerizate (cis and trans) achieved when applying the process of the invention to $C_4$ olefins can not be obtained at such high selectivity with $C_5$ and higher olefins, nevertheless the described catalysts can be used to advantage in isomerization of such higher olefins to promote principally shifting of the double bond and compare favorably for this purpose with other isomerization catalysts known to the art. In applying the invention to $C_5$ and higher olefins the reaction conditions pertaining to $C_4$ isomerization described above in general apply to these higher hydrocarbons with the preference being given to the milder portions of the described ranges.

What is claimed is:

1. Process of isomerizing olefins by shifting carbon-carbon double bonds, said olefins having isomerizable carbon-carbon double bonds in carbon chains of at least 4 carbon atoms, which comprises contacting a hydrocarbon stream containing at least one such isomerizable olefin with a catalyst consisting essentially of macroporous silica said macroporous silica having been prepared by process including the steps of base exchange treatment with aqueous ammonium nitrate followed by water washing to product macroporous silica containing less than 0.03% (dry basis) by weight of alkali metal oxide, under isomerization conditions including a temperature in the range of 800 to 1000° F.

2. The process of claim 1 wherein said macroporous silica has been leached at least once with aqueous acetic acid.

3. The process of claim 2 wherein said isomerizable olefin is one containing 4 to 6 carbon atoms.

4. The process of claim 3 wherein said isomerizable olefin is contained in a hydrocarbon stream which predominates in $C_4$ olefins.

5. The process of claim 3 wherein said isomerizable olefin is essentially a mixture of cis- and trans-butenes.

6. The process of claim 5 wherein said isomerization is effected at a temperature in the range of 800–850° F.

7. The method of increasing the butene-1 content of a hydrocarbon stream containing $C_4$ olefins including butene-2 and having less than an equilibrium quantity of butene-1, which comprises subjecting such stream to isomerization conditions in the presence of a macroporous silica catalyst essentially free of other added catalytic components and containing less than 0.03% (dry basis) by weight of alkali metal ions determined as alkali metal oxide, said macroporous silica having been base exchange treated with aqueous ammonium nitrate, and said isomerization conditions including a temperature in the range of 800 to 1000° F.

8. In the method of oxidative dehydrogenation of butylenes to butadiene, the improvement which comprises
   (a) initially fractionating a butylene charge stock to separate the same into (b) a fraction rich in butene-1 and
(c) a residual fraction comprising butene-2;
(d) isomerizing said residual butene-2 fraction over macroporous silica catalyst to obtain an isomerizate of enhanced butene-1 content, said macroporous silica having been prepared by process including the steps of base exchange treatment with aqueous ammonium nitrate followed by water washing to product macroporous silica containing less than 0.03% (dry basis) by weight of alkali metal oxide, said isomerizing being effected at a temperature in the range of 800 to 850° F.;
(e) recycling said isomerizate to fractionation at (a) to enhance the butene-1 content of said (b) fraction rich in butene-1;
(f) subjecting the total butene-1 rich fraction to oxidative dehydrogenation;
(g) fractionating the products from such oxidative dehydrogenation to recover butadiene separated from unconverted butylenes;
(h) and recycling said unconverted butylenes to isomerization in (d).

References Cited

UNITED STATES PATENTS 3,211,801  10/1965  Holm et al. _____ 260—683.2

FOREIGN PATENTS 945,707  1/1964  Great Britain.

OTHER REFERENCES

Eidus et al., Russian Chemical Reviews, vol. 32, No. 9 (September 1963) pp. 448–449.

PAUL M. COUGHLAN, JR., Primary Examiner

U.S. Cl. X.R.

252—449; 260—683.2

PO-1050
(5/69)

UNITED STATES PATENT OFFICE
CERTIFICATE OF CORRECTION

Patent No. 3,479,415  Dated November 18, 1969

Inventor(s) Samuel E. Shull

It is certified that error appears in the above-identified patent and that said Letters Patent are hereby corrected as shown below:

Column 2, line 16, "conent" should read --content--.

Column 3, line 29, "309.9" should read --30.9--.

Column 4, table, column 3, "817" should read --815--.

Column 4, table, all three occurrences of "0.1" should read --.01--.

Column 4, table, column 2, "89.4" should read --98.4--.

Column 5, line 15, "double" should read --doubled--.

Column 6, line 32, after "given" omit "to".

SIGNED AND
SEALED
MAY 12 1970

(SEAL)
Attest:

Edward M. Fletcher, Jr.
Attesting Officer

WILLIAM E. SCHUYLER, JR.
Commissioner of Patents